United States Patent [19]

Brauer et al.

[11] Patent Number: 5,029,395

[45] Date of Patent: Jul. 9, 1991

[54] ELECTRONICALLY AIDED COMPENSATION APPARATUS AND METHOD

[75] Inventors: Stephen F. Brauer; James R. Gender, both of St. Louis; Nicholas J. Colarelli, III, University City, all of Mo.

[73] Assignee: Hunter Engineering Company, Bridgeton, Mo.

[21] Appl. No.: 384,862

[22] Filed: Jul. 21, 1989

Related U.S. Application Data

[63] Continuation of Ser. No. 124,079, Nov. 23, 1987, abandoned.

[51] Int. Cl.⁵ ............................................. G01B 21/00
[52] U.S. Cl. ...................................... 33/203.18; 33/336
[58] Field of Search ............ 33/203.18, 203.19, 203.20, 33/203.21, 286, 288, 299, 335, 336, 337, 600, 608

[56] References Cited

U.S. PATENT DOCUMENTS

| | | | |
|---|---|---|---|
| 3,892,042 | 7/1975 | Senften | 33/203.18 |
| 3,901,094 | 8/1975 | Humbert | 33/336 |
| 3,913,236 | 10/1975 | Butler | 33/203.18 |
| 4,138,825 | 2/1979 | Pelta | 33/203.18 |
| 4,192,074 | 3/1980 | Chang | 33/203.18 |
| 4,274,738 | 6/1981 | Hollandsworth et al. | 33/203.18 |
| 4,389,793 | 6/1983 | Butler | 33/336 |
| 4,416,065 | 11/1983 | Hunter | 33/203.18 |
| 4,574,489 | 3/1986 | Grossart | 33/203.18 |
| 4,574,490 | 3/1986 | Curchod | 33/203.18 |
| 4,594,789 | 6/1986 | Marino et al. | 33/288 |
| 4,615,618 | 10/1986 | Bailey et al. | 33/288 |
| 4,718,759 | 1/1988 | Butler | 356/152 |

*Primary Examiner*—Thomas B. Will
*Attorney, Agent, or Firm*—Gravely, Lieder & Woodruff

[57] ABSTRACT

A wobble run-out compensation system includes a compensation plate mountable with respect to a vehicle wheel. First and second manually operable adjusting members allow for independently adjusting the orientation of the compensation plate in first and second orthogonal planes, an adjustment in one plane not affecting the orientation of the plate in the other plane. The orientation of the compensation plate in each of the first and second planes is electronically sensed and substantially continuously displayed on an electronic display as that orientation is being adjusted so that the user is able to observe changes on the electronic display in the orientation of the compensation plate as manual adjustments are made.

9 Claims, 6 Drawing Sheets

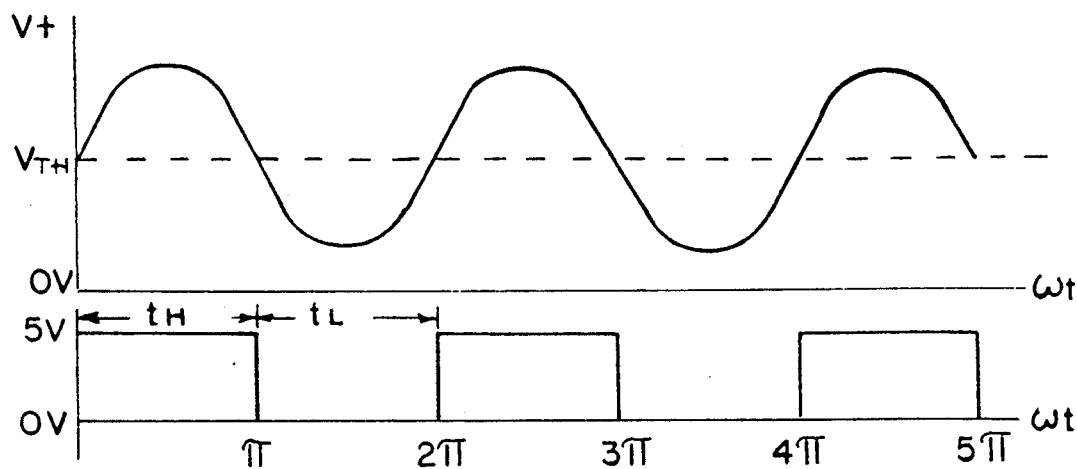
FIG. 5A. ZERO ANGLE.
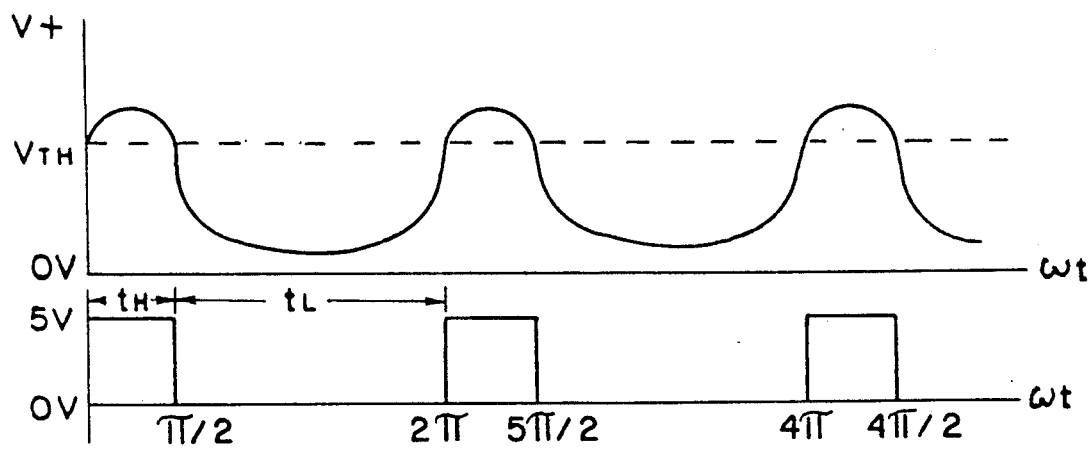
FIG. 5B. POSITIVE ANGLE, θ.
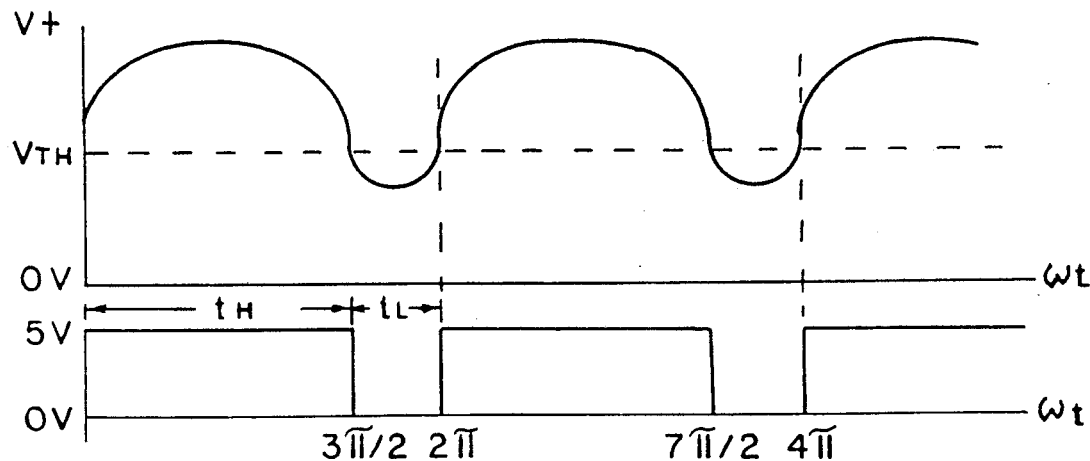
FIG. 5C. NEGATIVE ANGLE, -θ.

ELECTRONICALLY AIDED COMPENSATION APPARATUS AND METHOD

This is a continuation of copending application Ser. No. 07/124,079, filed on Nov. 23, 1987, now abandoned.

BACKGROUND OF THE INVENTION

1. Field of the Invention

This invention relates to improvements in wobble run-out compensation for any rotating body having a wobble run-out characteristic relative to a true relationship with its axis of rotation, and more particularly to a two-step compensation method using electronic assistance.

2. Description of the Prior Art

An example of a rotating body that may have a wobble run-out characteristic relative to its axis of rotation is a vehicle wheel. The plane of the wheel rim may not be perpendicular to the axle about which it rotates. In order to compensate for the lack of perpendicularity when mounting instrumentation apparatus on the wheel rim, heretofore mechanical compensation means has been provided to achieve perpendicularity. Mechanical compensation means involves providing adjustable threaded devices between the mounting plate for the instrumentation and a companion plate that is attached to the wheel rim. By adjusting the threaded devices the instrument mounting plate can be brought to a position where it does not wobble and is perpendicular with the axis of rotation of the wheel.

Adjustments with such mechanical means are made using estimates of wobble run-out compensation and often required an iterative process with one adjustment affecting one or more previous adjustments. Previous systems may have included visual aids in compensation adjustments such as toe-light beams, bubble levels, or camber gauges. No previous mechanical compensation system, however, electronically computed and displayed the magnitude and direction of the required manual adjustment.

When the mechanical compensation is completed, the instrument will be true with the axis of rotation and the instrumentation can accurately measure the angular orientation of the wheel axis in both vertical and horizontal planes. The vehicle wheel camber angle is relative to the vertical plane and the vehicle wheel toe angle is related to the horizontal plane of rotation. These two angular wheel positions are well known in the art of vehicle wheel alignment for proper running conditions.

Various electronic compensation systems have been used in the past. For example, U.S. Pat. No. 3,892,042 to Senften discloses an electronic run-out compensation system for electronically compensating for wobble run-out in a rotating body. In Senften the compensation is wholly electronic. As stated in col. 1, lines 54–58, the invention of Senften electronically compensates for wobble run-out characteristics so that no mechanical adjustments are needed. The Senften system works by averaging the wobble run-out from an electronic sensor at any two points 180 degrees apart to give the true plane of the wheel relative to its axis or spindle (see col. 2, lines 4–18).

As noted in Senften, it is known that the wobble follows a sinusoidal curve as the wheel is rotated about its axis or spindle At any two points of the sine wave 180 degrees apart, the deviation from the true plane is equal and opposite. Thus, by choosing any two points 180 degrees apart and electronically adding the values and dividing by two, the value of the angle of the true plane of the wheel axis or spindle is obtained. The angle of the wheel axis can also be determined from three or more measurement points that are separated by any known spacings by averaging the orthogonal component vectors of the measurements.

U.S. Pat. No. 4,138,825 to Pelta shows a purely electronic run-out compensation system (see col. 1, lines 55–61). In pelta, instead of taking two measurements in each of the vertical and horizontal planes to compensate for wobble run-out in both those planes, the electronic system in Pelta uses three measurements and computes the compensation in both planes from those three measurements (see col. 2, lines 16–30).

In like manner, U.S. Pat. No. 4,192,074 to Chang describes an on-the-fly run-out correction system which uses purely electronic compensation for wobble run-out. The operation of the Chang system is described in col. 2, lines 45–68 and col. 3, lines 1–68. In the Chang system the total wobble run-out errors are measured through at least one complete revolution of the vehicle wheel. The wheel is then stopped and the system computes the correction in both planes for the position where the wheel stopped. The wheel is lowered to the ground and the actual or true camber and toe angles of the wheel (corrected for wobble run-out by the system) are displayed for use by the person making the desired adjustments to the wheel.

U.S. Pat. No. 4,274,738 to Hollandsworth et al. also shows an electronic run-out compensation system which displays to the user the amount of wobble run-out compensation to be applied. A summary of the operation of the Hollandsworth et al system is set forth in col. 7, lines 14–68 and col. 8, lines 1–9.

SUMMARY OF THE INVENTION

Among the various objectives and features of the present invention may be noted the provision of a wobble run-out compensation system which electronically computes and visually displays the wobble run-out characteristics of a rotating body during adjustment so that initial mechanical adjustments can be correctly made.

Another objective of such a system is means which visually facilitate manual adjustment for the wobble run-out characteristics.

A third objective of such a system is to provide greater accuracy and speed than previous systems while simplifying the work of determining the vehicle alignment angles.

A fourth objective of the system is the provision of mechanical compensation means which independently functions in the toe and camber planes.

Other objects and features will be in part apparent and in part pointed out hereinafeter.

Briefly, in a first aspect a wobble run-out compensation system of the present invention includes a compensation plate mountable with respect to a rotatable body such as a vehicle wheel. A first manually operable adjusting member is provided for adjusting the orientation of the compensation plate in a first plane and a second manually operable adjusting member is provided for adjusting the orientation of the compensation plate in a second plane orthogonal to the first plane. The first and second adjusting members are independent so that a change in orientation in one of the first and second planes leaves the orientation of the compensation plate in the other plane unaffected. Circuitry is included for electronically sensing the orientation of the compensation plate in the first and second planes. A display responsive to the sensing circuitry visually displays the orientation of the compensation plate in the first and second planes.

In a second aspect of the present invention, a wobble run-out compensation system includes a compensation plate adjustably mountable with respect to a rotatable body such as a vehicle wheel and circuitry for sensing the orientation of the compensation plate in a pair of orthogonal planes. Manually operable members are provided for adjusting the orientation of the compensation plate in the orthogonal planes. A display is responsive to the sensing circuitry for visually displaying the orientation of the compensation plate substantially continuously as the orientation of the compensation plate is manually adjusted, so that the person performing the manual adjustment may discern the magnitude and direction of any desired adjustment by observing the display as the adjustment is made.

The method of the present invention includes the steps of initially mounting a compensation plate to the rotatable body so that the axis of rotation of the compensation plate is substantially coincident with the axis of rotation of the rotatable body. The orientation of the compensation plate in a first plane is then electronically sensed and the electronically sensed orientation in the first plane is visually displayed. The orientation of the compensation plate in the first plane is manually adjusted without changing the orientation of the compensation plate in a second plane, which second plane is perpendicular to the first plane. The electronic display substantially continuously displays the orientation of the compensation plate in the first plane throughout the manual adjustment so that the user performing the manual adjustment may observe the approach of the compensation plate orientation in the first plane to a predetermined orientation on the electronic display. Then the orientation of the compensation plate in the second plane is electronically sensed and that electronically sensed orientation is visually displayed on the electronic display. The orientation of the compensation plate in the second plane is then manually adjusted without changing the orientation of the compensation plate in the first plane. Again the orientation of the compensation plate in the second plane is substantially continuously displayed on the electronic display throughout the manual adjustment so that the user performing the manual adjustment may observe the approach of the compensation plate orientation in the second plane to a predetermined orientation on the electronic display.

DESCRIPTION OF THE DRAWINGS

The embodiment of the invention for accomplishing the method of electronically aided wobble run-out compensation of a rotating body such as a vehicle wheel is shown in the accompanying drawings, wherein:

FIG. 5A is a graphical representation of the periodic waveform associated with the movement of FIG. 3 and of the output of the system of FIG. 4 when the average position of the movement arm is the same as a vertical reference;

FIG. 5B is a graphical representation of the periodic waveform associated with the movement of FIG. 3 and of the output of the system of FIG. 4 when the angle formed by the intersection of the vertical reference and the average position of the movement arm is in the positive direction;

FIG. 5C is a graphical representation of the periodic waveform associated with the movement of FIG. 3 and of the output of the system of FIG. 4 when the angle formed by the intersection of the vertical reference and the average position of the movement arm is in the negative direction;

Similar reference characters indicate similar parts throughout the various views of the drawings.

DETAILED DESCRIPTION OF THE PREFERRED EMBODIMENT

Figure 1:
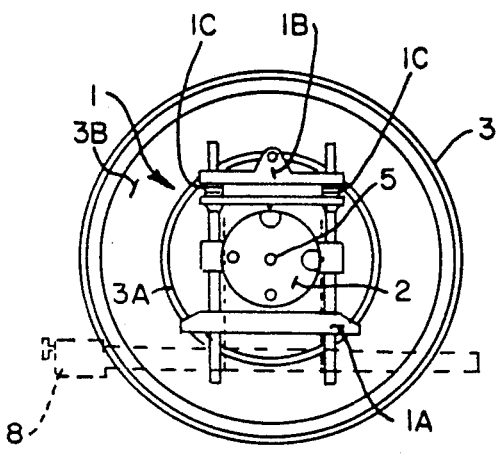
FIG. 1 is a side elevation of a front vehicle wheel with a wheel alignment measuring system of the present invention mounted on the vehicle wheels.
Figure 2:
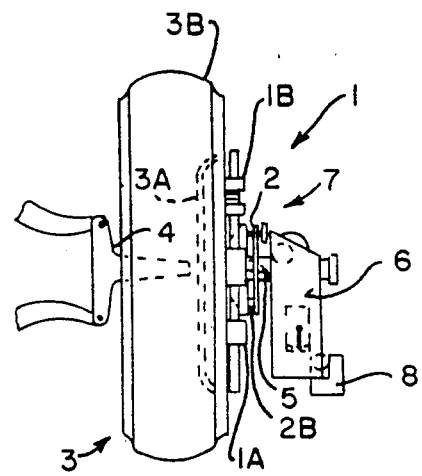
FIG. 2 is a rear elevation of the vehicle wheels and wheel alignment measuring system of FIG. 1.

A wheel adapter 1 (FIG. 1) and a compensation plate 2 are mounted on a vehicle wheel 3. The wheel includes a supporting rim 3A, mounted for rotation on a vehicle spindle 4 with a rubber tire 3B mounted on the rim. Mounted by a sensor shaft 5 to compensation plate 2 is a wheel alignment measuring apparatus 6 (shown in FIG. 2 but omitted for clarity in FIG. 1).

A separate wheel alignment measuring system 7 made up of a wheel adapter 1, compensation plate 2 and alignment measuring apparatus 6 is mounted on the rim of each of the wheels of a vehicle. In addition, the wheel alignment measuring apparatus for vehicle front wheels includes a toe arm 8 (FIG. 1) for measuring the toe alignment angles, while the wheel alignment measuring apparatus for rear wheels includes a mirror (not shown).

Wheel adapter 1 secures measuring apparatus 6 to the wheel. For this purpose the wheel adapter includes a pair of arms 1A and 1B. The lower arm 1A extends outwardly to contact the rim of the wheel in two places, and the upper arm 1B extends upwardly to contact the rim in one place. By compressing or expanding a set of wheel adapter springs 1C, the wheel adapter can be secured tightly to the vehicle wheel rim.

Sensor shaft 5 is disposed coincident with the center of the compensation plate and preferable coincident with the axis of rotation of the vehicle wheel. Mounted thereto is wheel alignment measurement apparatus 6. Apparatus 6 comprises a housing containing an inclinometer or transducer 11 (FIGS. 3 and 4) which is oriented to detect and measure angles in the camber direction. Contained also inside the alignment measuring apparatus is the necessary electronics (FIGS. 4 and 6) to monitor the camber angle and to drive a liquid crystal display 12 (FIGS. 11A-11C) visible to the user on the top of wheel alignment measuring apparatus 6.

A preferred angle measuring transducer 11 (FIGS. 3 and 4) for use in the present invention includes a meter movement vane or arm 13 movable about a pivot point 15 in response to current flow in an armature coil 17 around a magnetic core 19. The vane or arm 13 is intended to move relative to a vertical reference 21 in determining the angle $\Theta$. The displacement of vane 13 is the result of the forces shown applied at the center of gravity 23 of the vane.

Figures 3, 4, 7:
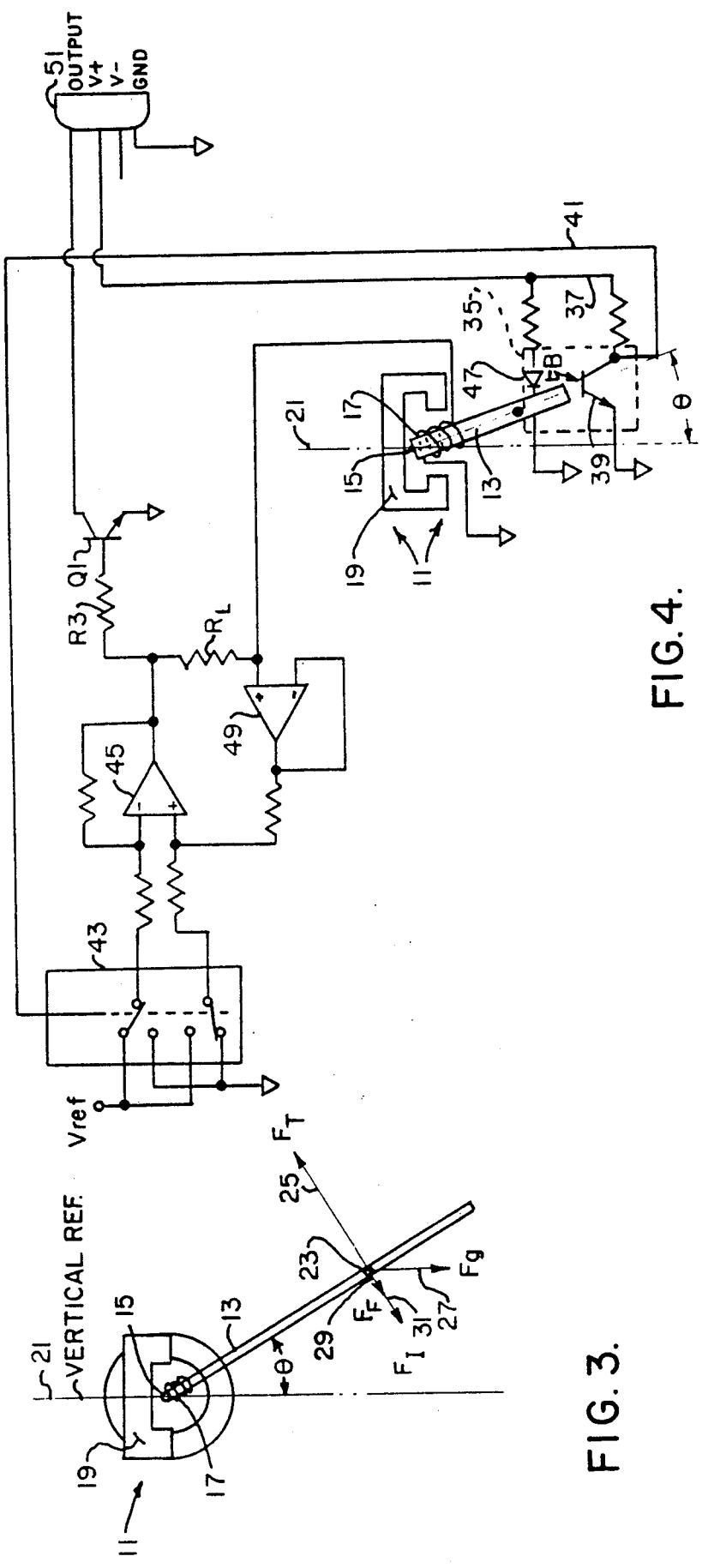
FIG. 3 is a schematic free body diagram of a meter movement incorporated into the apparatus of the present invention.
FIG. 4 is an electrical schematic of the servo control system for the movement of FIG. 3.
FIG. 7 is an electrical schematic illustrating a selectable frequency feature of the system of FIG. 6.

The force $F_T$ due to the displacing torque applied by armature coil 17 to vane 13 is represented in FIG. 3 by arrow 25 directed perpendicularly to vane 13 through the center of gravity 23. This applied torque force $F_T$ is opposed by the force of gravity $F_g$, represented in FIG. 3 by arrow 27. The applied torque force $F_T$ is also opposed by a frictional force $F_F$, represented by arrow 29, and a force $F_I$ due to inertia and represented by arrow 31. Vane 13 is shown displaced by the angle $\Theta$ as the result of the magnitude of force $F_T$ due to the applied torque, which has overcome the opposing forces of gravity $F_g$, friction $F_F$, and inertia $F_I$.

Vane 13 is in equilibrium when the force $F_T$ due to the applied torque is equal to the sum of the frictional force $F_F$ and the gravitational force $F_g$ multiplied by the sine of $\Theta$, $F_g\sin(\Theta)$.

In the case of an AC servo, such as the transducer system of FIGS. 3 and 4, the average vector sum of all tangential forces must equal zero. As the angle $\Theta$ formed between the average position of vane 13 and the vertical reference 21 increases in the counterclockwise (positive) direction, the tangential component of the force $F_g$ due to gravity increases. As a result, a larger average force $F_T$ due to the applied torque is required to displace vane 13 through the line of sight of an optical interrupter 35 (FIG. 4). At angles less than ten degrees, the tangential component of the gravitational force $F_g$ can be approximated as linearly proportional to the angle $\Theta$ (since for small angles the sine of an angle is approximately proportional to the angle) and to the torque applied at equilibrium.

For the meter movement vane 13 to operate properly, the force $F_T$ due to the applied torque must be much larger in magnitude than the frictional force $F_F$ and the inertial force $F_I$. Furthermore, the force $F_T$ must not be so large that it significantly overcomes the tangential component of the gravitational force $F_g$, since otherwise the duty cycle of the output would not deviate from fifty per cent. The drive current in armature coil 17, the mass of vane 13, the construction of transducer 11, and the intended range of the transducer determine how accurate and immune to noise the transducer will be.

Referring now to FIG. 4, the servo system for transducer movement 11 includes optical interrupter 35. When operation commences, the optical interrupter 35 will either have its light beam B blocked by vane 13 or it will not. If it is blocked, the output of a phototransistor 39 making up half of optical interrupter 35 becomes greater than $V^+/2$ volts. This output is supplied on a line 41 to the direction control input of an analog multiplexer 43. Voltage $V^+/2$ is the threshold voltage for the analog multiplexer. This particular output of the phototransistor thus causes the multiplexer 43 to supply a reference voltage $V_{ref}$ to the inverting input of an operational amplifier 45. The noninverting input of op amp 45 is at the same time connected by the multiplexer to ground. As a result op amp 45 supplies a positive current through a resistor $R_L$ to armature coil 17. This current has a magnitude of $V_{ref}/Rr_L$, and causes the vane to move in the direction to unblock optical interrupter 35.

Once vane 13 moves to a position that unblocks optical interrupter 35, the light emitting diode (LED) 47 of the optical interrupter illuminates phototransistor 39. Phototransistor 39 then conducts current, lowering the direction control signal on line 41 to some value less than $V^+/2$ volts. This causes multiplexer 43 to switch and apply the voltage $V_{ref}$ to the noninverting terminal of op amp 45, which results in a negative current of magnitude $V_{ref}/R_L$ being applied by means of amplifier 45 to the armature coil 17. Vane 13 as a result moves to block LED 47 from illuminating phototransistor 39. In this manner switching of the control voltage to multiplexer 43 causes vane 13 to dither continuously and repetitively.

The output of op amp 45 is also connected through a resistor R3, having a resistance much greater than that of resistor R1, to the base of an npn transistor Q1. The voltage on the collector of transistor Q1 is the output& of transducer 11, which is supplied to the circuitry of FIG. 6 via a connector 51.

As the frequency of the dithering of vane 13 is increased, the directional control frequency increases. For a given vane movement and current drive, the frequency can be increased by reducing the hysteresis of the direction control input of multiplexer 43. The preferred implementation uses a typical CMOS gate input which has very little hysteresis and switches at $V^+/2$. For maximum immunity to external vibrations and oscillations, the movement of vane 13, both the current through resistor $R_L$ and the input hysteresis characteristics should be selected to achieve a directional control signal which is sinusoidal when the average vane position is the same as vertical reference 21 and has a magnitude from $3V^+/4$ to $V^+/4$.

Figure 6:
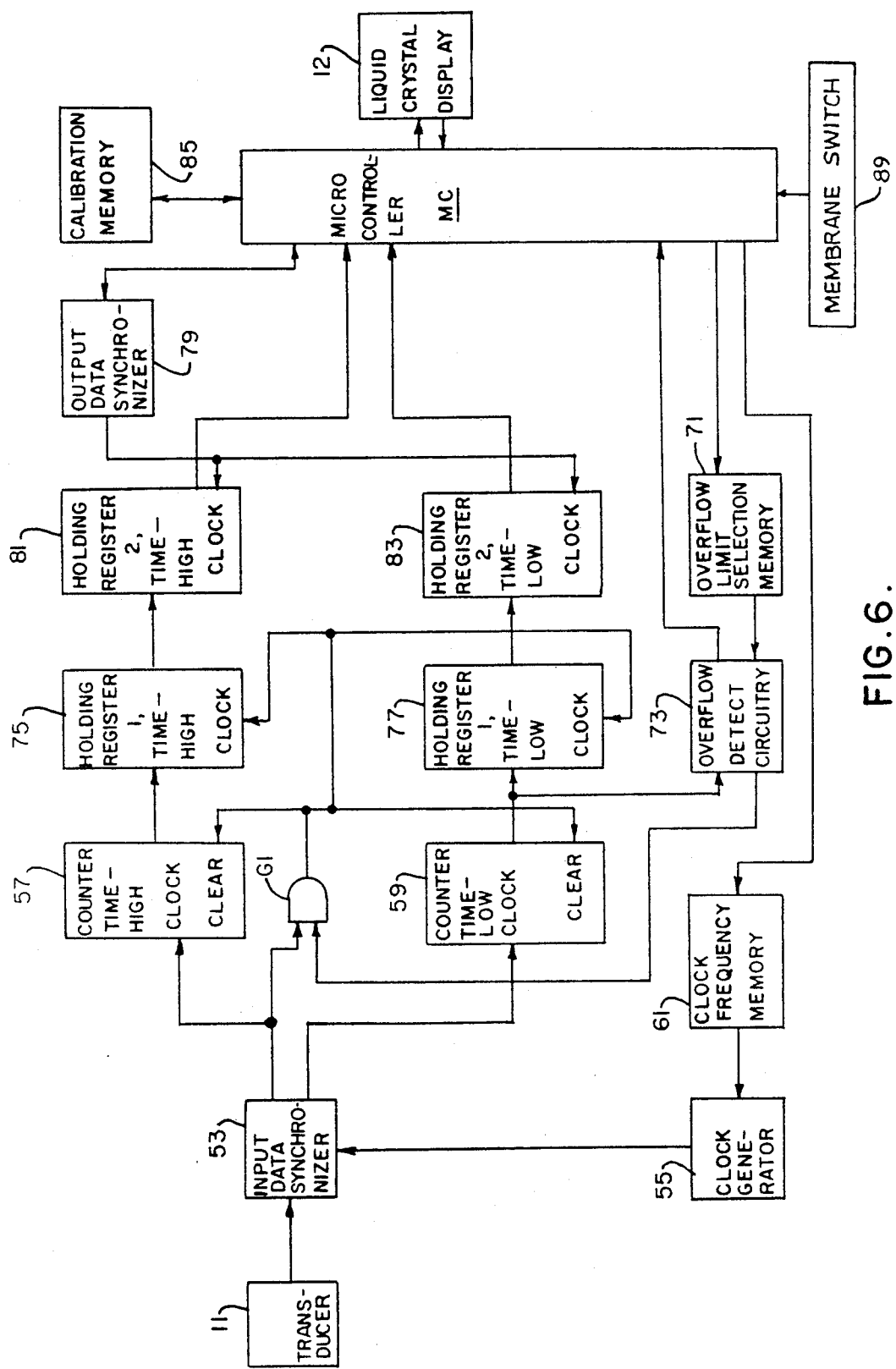
FIG. 6 is a block diagram of circuitry for converting the output of the circuitry of FIG. 4 to an angle.

A functional diagram of the circuitry necessary to convert the transducer output at connector 51 into an angle is detailed in FIG. 6. Transducer 11 supplies an asynchronous digital waveform input to an input data synchronizer 53. By way of example, input data synchronizer 53 may be simply implemented as a D-type latch, such as half of a 74LS74-type latch, having its D-input connected to the output of transducer 11 and its clock input connected to a system clock such as the clock generator 55 shown in FIG. 6.

The waveform from transducer 11 has a duty cycle whose deviation from fifty per cent (50%) is directly proportional to the angle, $\Theta$, being measured. The frequency of this waveform is dependent on the individual transducer. Therefore the input of the data synchronizer 53 is asynchronous with respect to clock 55. When the input from transducer 11 is high (a logic "1"), data synchronizer 53 supplies synchronous clock pulses to the clock input of a time-high counter 57 at a frequency equal to that of clock 55. Counter 57 is preferably a high-speed counter capable of counting up to ten thousand or so in one-half second or less. Such a counter is easily implemented using a cascaded set of four 74LS161A-type counters.

When the input to data synchronizer 53 is low (a logic "0"), synchronizer 53 supplies synchronous clock pulses to a second counter, a time-low counter 59. These pulses again are at the frequency of the clock. Counter 59 is also easily implemented using a cascaded set of four 74LS161A-type counters.

While one counter is active, the other counter is disabled. This is accomplished by deriving the clocking signal for counter 57 from the Q-output of data synchronizer 53 and the clocking signal for counter 59 from the Q-bar output of the data synchronizer.

The circuitry of FIG. 6 also includes a microcontroller MC, such as an 8051-type microcomputer, which can select clock frequencies of 83.3 KHz, 41.7 KHz, and 20.8 KHz. This selection is accomplished by changing the contents of a clock frequency memory 61. As shown in FIG. 7, clock frequency memory 61 (a 74LS374-type chip) is connected to the select pins of a 4:1 multiplexer 63 which makes up part of clock 55. Clock 55 also includes an eight MHz clock 65 connected through a divide-by-six counter 67 to a divide-by-N counter 69. Counter 69 has its 20 KHz, 40 KHz and 80 KHz outputs connected to the inputs of the 4:1 multiplexer 63, so that the output of multiplexer 63 is the desired frequency signal as determined by clock frequency memory 61.

As the transducer vane 13 dithers, time-high counter 57 records the amount of time that the output was a logic "1", and time-low counter 59 records the amount of time that the output was a logic "0". Both counters are sixteen bit counters, allowing for a maximum count of 65535. To achieve a resolution of 0.001 degrees with a range of +/− eight degrees, the angle should be computed after the counters have reached an average count of 10,000. For a transducer vane 13 which dithers at a frequency of 30 Hz and a clock 55 with a clock frequency of 20.8 KHz when the average position of the vane intersects the vertical reference, the counters will both reach a count of 10,000 after fifteen dithering operations are complete. This takes one-half second. The resulting angle would be of fifteen samples taken over one-half second. The next angle calculated by microcontroller MC is also the average of fifteen new samples, and contains no information from the previous counting cycle. Note that any counting cycle is independent of the actual transducer dithering frequency. This allows for manufacturing tolerances, greater producibility and greater reliability.

When the average position of the vane of transducer 11 intersects the vertical reference (such an output is illustrated in FIG. 5A), time-high counter 57 and time-low counter 59 contain approximately the same amount of counts at any given time. If, however, the transducer is at a different angle, $\Theta$, one counter will contain more counts than the other after the counting cycle is complete. FIG. 5B shows a case where the output is high one-quarter of the time. In this case when time-low counter 59 reaches 10000, time-high counter 57 is only at 3333. In this case the average count is only 6666 which decreases the resolution of the angle by 33%. For this reason, microcontroller MC can select the overflow limit for the time-low counter 59. By changing the contents of an overflow limit selection memory 71, the system can guarantee a minimum time-low count at counter 59 of 4096, 6144, 10240, or 14336.

The system of FIG. 6 includes overflow detect circuitry 73 which monitors the counts in time-low counter 59. When counter 59 reaches the overflow limit set by microcontroller MC through overflow limit selection memory 71, overflow detect circuit 73 supplies a signal to that effect to an AND gate G1. The other input to gate G1 is connected to the time-high output of input data synchronizer 53, so when the transducer 11 input completes a dither by returning to a logic "1", the output of gate G1 goes high. The output of gate G1 when it goes high causes the contents of counters 57 and 59 to be stored in a bank of holding registers 75 and 77 respectively and the contents of counters 57 and 59 to be cleared.

Although the output of gate G1 is shown for clarity in FIG. 6 as being connected directly to the clear inputs of the counters 57 and 59 and the clock inputs of holding registers 75 and 77, it should be understood that the storing of the data in the holding registers takes place before the clearing of the counters. For this purpose, the output of gate G1 is actually supplied through a first D-type latch to clock the holding registers, and the Q-output of that latch is supplied to a second D-type latch to clear the counters one-half clock period later. It is necessary to wait until a dither is completed to insure that the counts reflect the actual duty cycle of the periodic waveforms illustrated in FIGS. 5. Also, this allows the digital system to adjust to any reasonable transducer input frequency. After the counts have been saved and the counters cleared, the overflow detect circuitry 73 informs microcontroller MC that new data is available to be processed.

At this point, microcontroller MC has been alerted that new counts exist. When the microcontroller MC is ready, it signals an output data synchronizer 79. Output data synchronizer is preferably made up of two D-type latches connected in series so that the output of the first D-latch changes state before that of the second. The output data synchronizer is connected to the clock inputs of a second pair of holding registers 81 and 83. The appropriate clocking signals from output data sysnchronizer 79 transfer the data from first holding registers 75 and 77 to second holding registers 81 and 83, without disturbing the current counting operations which are in progress in counters 57 and 59. Output data synchronizer 79 then signals microcontroller MC that all data is latched and ready to be read in. Microcontroller MC then reads, one byte at a time, the raw data from holding registers 81 and 83 it needs to compute the angle Θ.

The circuitry of FIG. 6 digitally determines the duty cycle from transducer 11 using high speed digital counters. Since the system is digital, it is not susceptible to noise. Furthermore, the counting operations happen in parallel with any other microcontroller activity, increasing the throughput of the system.

To compute the measured angle, Θ, microcontroller MC must recall two constants which are stored in a calibration memory 85. The first, a range constant $K_r$, proportions the angle computations to the actual angle, and the second, a zero constant $K_z$, zero adjusts the angle computation to the actual angle. The angle is computed as follows:

$$\text{Measured angle, } \theta = K_r * \frac{(\text{time-high count} - \text{time-low count})}{(\text{time-high count} + \text{time-low count})} - K_z$$

The angle is then used by the microcontroller in controlling the display of liquid crystal display 12 as described below.

Figure 8C:
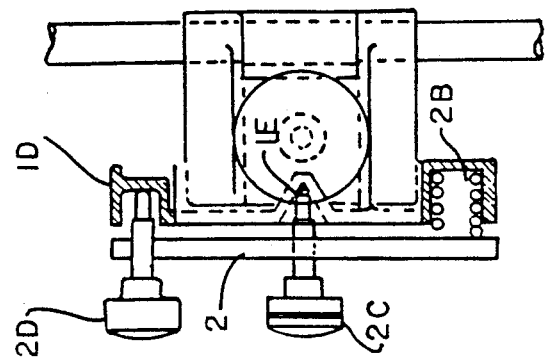
FIG. 8C is a cross-sectional view taken along line 8C—8C of FIG. 8B showing the wheel adapter of FIG. 8A.
Figure 8A:
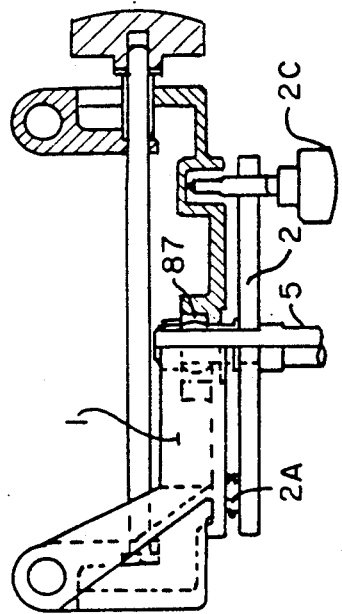
FIG. 8A is a top plan with parts removed and broken away for clarity of a wheel adapter and compensation plate assembly used by the measuring system for vehicle wheel alignment of FIG. 1.
Figure 8B:
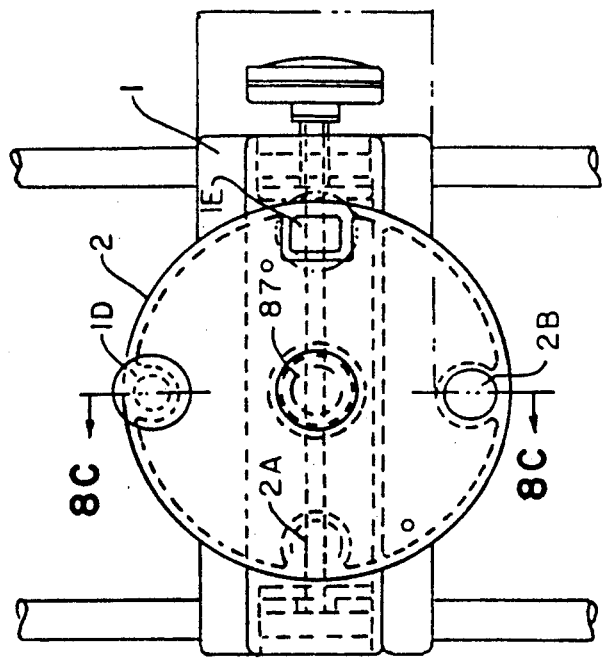
FIG. 8B is a front elevation of the wheel adapter of FIG. 8A.

The compensation plate assembly from which transducer 11 is suspended is detailed in FIGS. 8A–8C. The sensor shaft 5 is fixed perpendicular to compensation plate 2 and is attached to the wheel adapter 1 by means of a spherical bearing 87. This spherical bearing is located at the center of rotation of compensation plate 2. The compensation plate has a vertical axis, the y-axis, and a horizontal axis, the x-axis. On each axis, there is a preload spring 2A, 2B and a single adjustment knob 2C, 2D. Each spring is located on the opposite side of the center of rotation of the compensation plate from its corresponding adjustment knob. The preload springs, mounted between the wheel adapter and the compensation plate, supply constant pressure to the compensation plate. This offsets the pressure applied by the adjustment knobs and holds the compensation plate in the adjusted position with respect to the wheel adapter, which functions as a mounting plate. The adjustment knobs are screwed through corresponding threaded bores in the compensation plate and are forced by the preload springs to contact the wheel adapter. The camber plane adjustment knob 2D contacts the wheel adapter in a counterbore 1D (FIG. 8C) and the toe plane adjustment knob 2C contacts the wheel adapter in an index notch 1E. The index notch eliminates one degree of freedom, and prevents the compensation plate 2 from rotating about the sensor shaft 5. The adjustment knobs can be turned either direction to rotate the compensation plate about spherical bearing 87. Since the y-axis and the x-axis are perpendicular to each other, turning one adjustment knob, hence adjusting the wobble run-out in one axis, does not effect the wobble run-out in the other axis.

Figure 9:
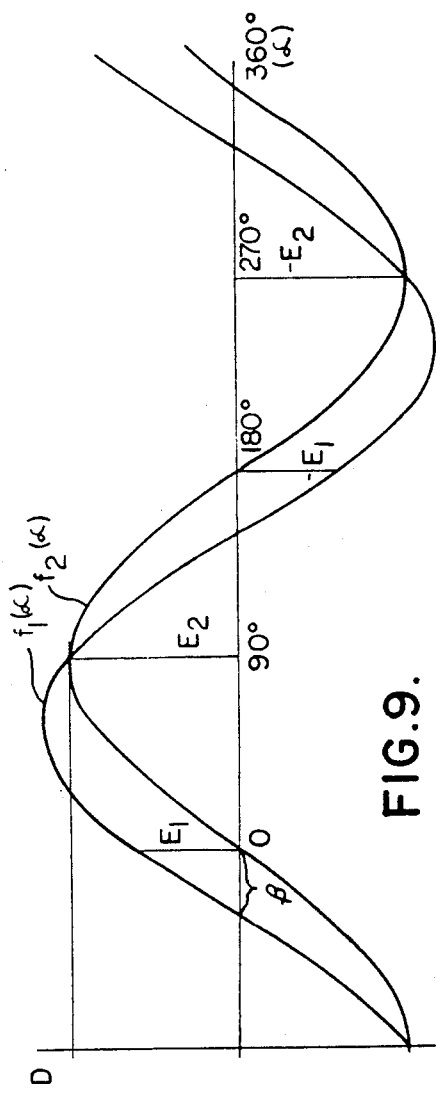
FIG. 9 is a graphical representation of the theoretical characteristics of wobble run-out through out the compensation procedure.

It is well known that for two perpendicular vectors, a change in one does not effect the vector addition of the two. This is illustrated in the case of a complex wobble run-out condition of a rotating body in FIGS. 9 and 10A–10E. After the wheel adapter has been mounted on the wheel, it is assumed that there exists a complex wobble run-out condition shown graphically in FIG. 9 as $f1(\alpha)$. If the wheel were to be rotated while the camber angle was recorded, there would be a largest camber angle at some point and a smallest camber angle 180 degrees apart from the largest. The algebraic average of these two angles is the true camber of the vehicle wheel, and is also the angle to which the compensation plate will be adjusted by knobs 2C and 2D. This rotational angle of the wheel exists in the complex wobble run-out compensation plane at two points, 90 and 270 degrees from the angle of the wheel with the largest camber angle. One of these points is illustrated in FIG. 9 as the rotational angle beta. The wobble run-out at this point is reflected in both the camber plane and the toe plane. The correct adjustment of the camber plane adjustment knob 2D reduces the wobble run-out characteristic to a single axis characteristic shown in FIG. 9 as $f2(\alpha)$. This wobble run-out will be only in one plane and will coincide exactly with the toe plane. At this point, the correct adjustment of the toe plane adjustment knob 2C will eliminate the remaining single axis wobble run-out leaving the camber and toe planes orthogonal to the axis of rotation of the wheel. The alignment equipment is now prepared to measure vehicle alignment angles.

Figure 11A:
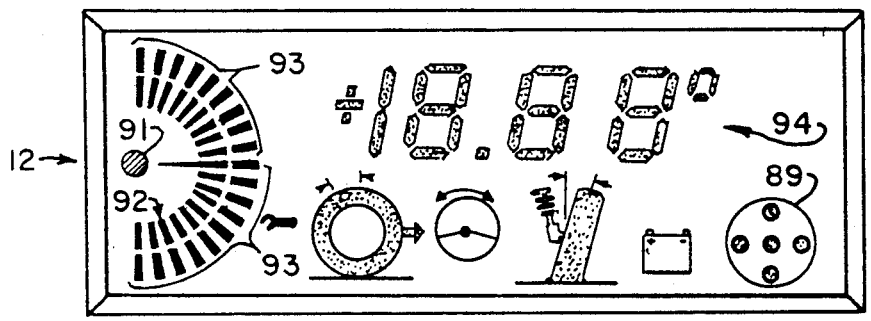
FIG. 11A is a top plan of a liquid crystal display used with the system of the present invention with all segments 'on'.

The following details a two step procedure for mechanically compensating for wobble run-out in a rotating body, specifically a vehicle wheel, using electronic assistance. FIGS. 10A–10E detail the steps of the procedure, and FIGS. 11A–11C illustrate the visual display available to the operator during the procedure.

Figures 10A, 10B, 10C, 10D, 10E:
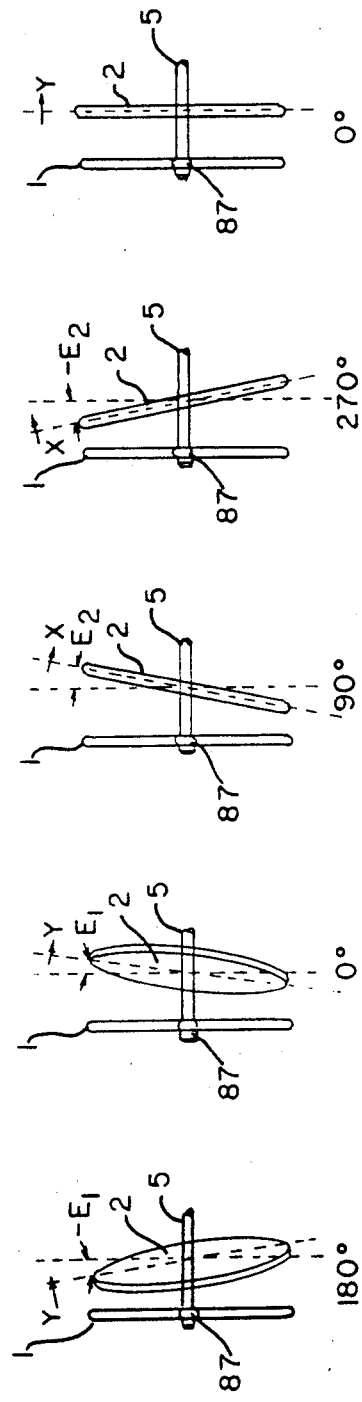
FIG. 10A is a schematic illustration of a vehicle wheel position and wobble run-out orientation at one stage of the compensation procedure.
FIG. 10B is a schematic illustration of a vehicle wheel position and wobble run-out orientation at a second stage of the compensation procedure.
FIG. 10C is a schematic illustration of a vehicle wheel position and wobble run-out orientation at a third stage of the compensation procedure.
FIG. 10D is a schematic illustration of a vehicle wheel position and wobble run-out orientation at a fourth stage of the compensation procedure.
FIG. 10E is a schematic illustration of a vehicle wheel position and wobble run-out orientation at the end of the compensation procedure.

After the equipment is properly mounted on a vehicle wheel, the electronics should be initialized to the compensation mode by pressing a membrane switch 89 (FIG. 11A) bearing a suitable indicia or marked 'Compensation' or the like, herein referred to as the compensation switch. At this point display 12 (FIGS. 11A–11C) goes blank. The wheel is rotated until the sensor mounting apparatus is inverted (FIG. 10A). This is the 180 degree position. When the compensation switch is pressed again, the electronics store the camber angle at the 180 degree position and a compensation indicator 91 begins to flash to indicate that a compensation calculation is pending. The wheel is rotated 180 degrees until the sensor mounting apparatus is right side up (FIG. 10B). This is the zero rotational degree position. When the compensation switch is pressed again, the electronic circuitry stores the camber angle at the zero rotational degree position, computes the true camber angle and initializes the display for the camber plane adjustment.

Figure 11B:
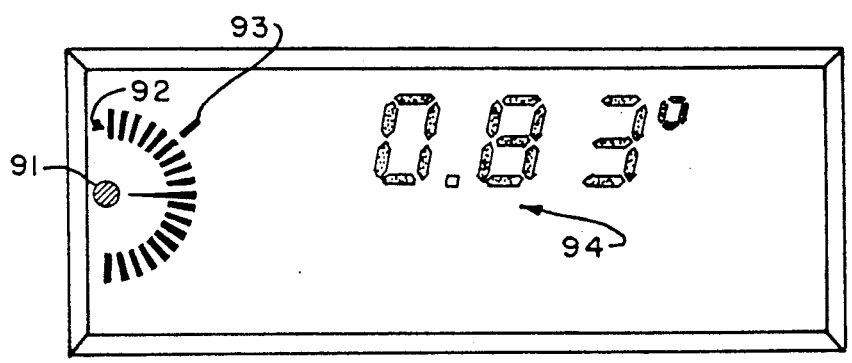
FIG. 11B is a view similar to FIG. 11A of the liquid crystal display prior to one of the two compensation adjustments.
Figure 11C:
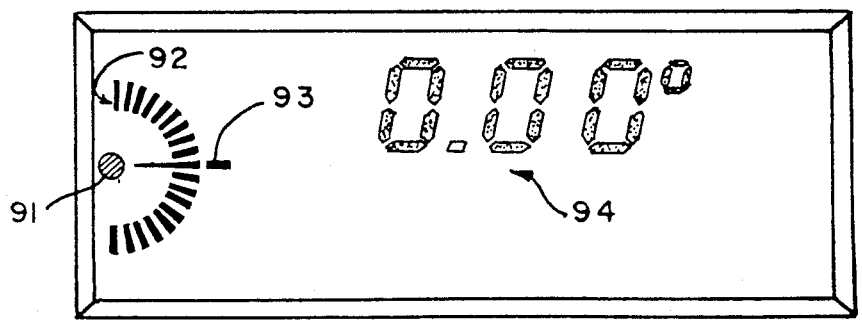
FIG. 11C is a view similar to FIGS. 11A and 11B after one of the two compensation adjustments.

A sample adjustment display is shown in FIG. 11B. The display turns on the compensation indicator 91 without flashing to indicate the required compensation adjustment, turns on a circular bar graph 92, a bar graph cursor 93, and a digital adjustment magnitude display 94. In the example detailed in FIGS. 11, the camber plane adjustment knob 2D is turned clockwise in order to move bar graph cursor 93 clockwise around bar graph 92 to null the display as shown in FIG. 11C. In all cases, the bar graph cursor moves the same direction as the adjustment knob and substantially continuously displays the actual orientation of the compensation plate. In this way, the bar graph aids the operator by indicating the proper direction and magnitude of the adjustment. The bar graph cursor 93 and the digital adjustment magnitude display 94 illustrate graphically and numerically the magnitude of the adjustment. This first step, when completed, quickly and accurately eliminates all wobble run-out in the camber plane. At this point, the wobble run-out characteristic has been reduced to a single axis characteristic lying totally in the toe plane.

Theoretically, if the wobble run-out characteristic were purely sinusoidal, and if step 1 had been completed carefully, then the second step would merely be an adjustment of the toe plane adjustment knob 2C to the null position of the bar graph. This would eliminate all remaining wobble run-out in the compensation plate. In practice, however, it has been found to be more accurate to recompute the compensation values in the toe plane also. This eliminates any accumulation of errors from the camber adjustment step and from any nonsinusoidal behavior of the wobble run-out characteristic.

Step two simply repeats the procedure of step one for the toe plane. The electronics should be initialized again by pressing the compensation switch 89. At this point the display goes blank. The wheel is rotated until it is in the ninety degree position (FIG. 10C). When the compensation switch is pressed again, the electronics of FIG. 6 store the camber angle at the ninety degree position and the compensation indicator 91 begins to flash to indicate that a compensation calculation is pending. The wheel is manually rotated until it is in the 270 degree position (FIG. 10D). When the compensation switch is pressed again, the electronics store the camber angle at the 270 degree position, compute the true camber angle, and initialize the display for the camber plane adjustment. The display turns on the compensation indicator without flashing to indicate the required compensation adjustment, turns on the circular bar graph 92, the bar graph cursor 93, and the digital adjustment magnitude display 94. The toe plane adjustment knob 2C is manually turned in the indicated direction until the display is nulled as in FIG. 11C. At this point, all wobble run-out has been eliminated and the wheel should be returned to the zero degree position (FIG. 10E). The system is now ready for alignment measurements.

In view of the above, it will be seen that the various objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A wobble run-out compensation system comprising:
    a wobble run-out compensation plate mountable with respect to a vehicle wheel so that the wobble run-out compensation plate fixedly rotates with the vehicle wheel;
    first manually operable adjusting means for adjusting the orientation of the wobble run-out compensation plate in a first plane;
    second manually operable adjusting means for adjusting the orientation of the wobble run-out compensation plate in a second plane orthogonal to the first plane;
    said first and second manually adjusting means being independent so that a change in orientation in one of the first and second planes leaves the orientation of the wobble run-out compensation plate in the other plane unaffected;
    means for electronically sensing the orientation of the wobble run-out compensation plate in the first and second planes;
    means for initiating the recording of the orientation of the wobble run-out compensation plate a first predetermined vehicle wheel rotational position and at a second vehicle wheel rotational position separated by 180 degrees from said first position;
    said sensing means having means responsive to the initiating means for recording the orientations of the wobble run-out compensation plate at vehicle wheel rotational positions separated by 180 degrees and for electronically determining wobble run-out in the first plane from said recorded orientations; and
    display means responsive to the electronic determination of the wobble run-out by the sensing means for visually displaying the amount and direction of any necessary adjustment to the wobble run-out compensation plate to mechanically compensate for the wobble run-out determined by the sensing means;
    said display means including electronic display means responsive to the electronic determination of the wobble run-out and to the changing orientation of the wobble run-out compensation plate as sensed by the sensing means resulting from manual adjustment of the wobble run-out compensation plate for substantially continuously displaying the orientation of the wobble run-out compensation plate as the orientation of said plate is manually adjusted to compensate for the wobble run-out, whereby the person performing the manual adjustment of the wobble run-out compensation plate may discern the magnitude and direction of any desired adjustment to the wobble run-out compensation plate by observing the display means as the adjustment is made.

2. The compensation system as set forth in claim 1 wherein the display means includes a first set of visual indicia for indicating a range of possible values for the orientation of the compensation plates, and a second set of visual indicia for indicating the actual value of said orientation, the first set of visual indicia being disposed such that in combination with the second set they indicate to an observer both the magnitude and direction of any desired adjustment.

3. The compensation system as set forth in claim 1 wherein the electronic display means is disposed adjacent the first and second manually operable adjusting means to facilitate the viewing of the display means by the user as the first and second manually operable adjusting means are operated.

4. A wobble run-out compensation system comprising:
    a wobble run-out compensation plate adjustably mountable with respect to a vehicle wheel so that the wobble run-out compensation plate fixedly rotates with the vehicle wheel;
    means for sensing the orientation of the wobble run-out compensation plate in a pair of orthogonal planes;
    manually operable means for adjusting the orientation of the wobble run-out compensation plate in said orthogonal planes; and
    means for initiating the recording of the orientations of the wobble run-out compensation plate at a first predetermined vehicle wheel rotational position and at a second vehicle wheel rotational position separated by 180 degrees from said first position;
    said sensing means having means responsive to the initiating means for recording the orientations of the wobble run-out compensation plate at a vehicle wheel rotational positions separated by 180 degrees and for electronically determining wobble run-out in a first one of said pair of orthogonal planes from said recorded orientations; and display means responsive to the electronic determination of the wobble run-out by the sensing means for visually displaying the amount and direction of any necessary adjustment to the wobble run-out compensation plate to mechanically compensate for the wobble run-out determined by the sensing means;

said display means including electronic display means responsive to the electronic determination of the wobble run-out and to the changing orientation of the wobble run-out compensation plate as sensed by the sensing means resulting from manual adjustment of the wobble run-out compensation plate for substantially continuously displaying the orientation of the wobble run-out compensation plate as the orientation of said plate is manually adjusted to compensate for the wobble run-out, whereby the person performing the manual adjustment may discern the magnitude and direction of any desired adjustment by observing the display means as the adjustment is made.

5. The compensation system as set forth in claim 4 wherein the electronic display means is disposed adjacent the first and second manually operable adjusting means to facilitate the viewing of the display means by the user as the first and second manually operable adjusting means are operated.

6. The compensation system as set forth in claim 4, wherein the display means includes a first set of visual indicia for indicating a range of possible values for the orientation of the compensation plate, and a second set of visual indicia for indicating the actual value of said orientation, the first set of visual indicia being disposed such that in combination with the second set they indicate to an observer both the magnitude and direction of any desired adjustment.

7. A method of compensating for wobble run-out in a vehicle wheel, comprising the steps of:

initially mounting a wobble run-out compensation plate to a vehicle wheel so that the wobble run-out compensation plate fixedly rotates with the vehicle wheel;

electronically sensing the orientations of the wobble run-out compensation plate at first and second rotational positions of the vehicle wheel separated by 180 degrees and electronically determining wobble run-out in a first plane from said orientation;

visually displaying on an electronic display the necessary manual adjustment of the wobble run-out compensation plate to compensate for the electronically determined wobble run-out in the first plane;

manually adjusting the orientation of the wobble run-out compensation plate in the first plane without changing the orientation of the wobble run-out compensation plate in a second plane, said second plane being perpendicular to the first plane, said electronic display substantially continuously displaying the remaining necessary manual adjustment of the wobble run-out compensation plate in the first plane throughout the manual adjustment so that the user performing the manual adjustment may observe on the electronic display the approach of the wobble run-out compensation plate adjustment in the first plane to the total adjustment necessary to compensate for the electronically determined wobble run-out in the first plane;

electronically sensing the orientations of the wobble run-out compensation plate at third and fourth rotational positions of the vehicle wheel separated by 180 degrees, said third and fourth rotational positions being separated by 90 degrees from the first and second rotational positions, and electronically determining wobble run-out in the second plane from said orientations;

visually displaying on the electronic display the necessary manual adjustment of the wobble run-out compensation plate to compensate for the electronically determined wobble run-out in the second plane; and manually adjusting the orientation of the wobble run-out compensation plate in the second plane without changing the orientation of the wobble run-out compensation plate in the first plane, said electronic display substantially continuously displaying the remaining necessary manual adjustment of the wobble run-out compensation plate in the second plane throughout the manual adjustment so that the user performing the manual adjustment may observe on the electronic display the approach of the wobble run-out compensation plate adjustment in the second plane to the total adjustment necessary to compensate for the electronically determined wobble run-out in the second plane.

8. The method as set forth in claim 7 wherein the displaying steps include displaying indicia representing a range of possible values for the orientation of the wobble run-out compensation plate being sensed and at the same time displaying adjacent one of said indicia a second indicia to indicate the actual value of the orientation at that time.

9. The method as set forth in claim 8 wherein the displaying steps include the steps of holding the range representing indicia fixed while causing the second indicia to change position as the orientation of the wobble run-out compensation plate changes.

* * * * *